(No Model.) 3 Sheets—Sheet 2.

T. H. PAESSLER.
TRICYCLE.

No. 320,677. Patented June 23, 1885.

WITNESSES:
W. W. Hollingsworth
W. K. Stevens

INVENTOR:
T. H. Paessler
BY Munn & Co.
ATTORNEYS.

(No Model.) 3 Sheets—Sheet 3.

T. H. PAESSLER.
TRICYCLE.

No. 320,677. Patented June 23, 1885.

WITNESSES:
W. W. Hollingsworth
W. X. Severn

INVENTOR:
T. H. Paessler
BY Munn & Co.
ATTORNEYS.

N. PETERS, Photo-Lithographer, Washington, D. C.

UNITED STATES PATENT OFFICE.

THEOPHILUS H. PAESSLER, OF MALVERN, OHIO.

TRICYCLE.

SPECIFICATION forming part of Letters Patent No. 320,677, dated June 23, 1885.

Application filed January 10, 1885. (No model.)

*To all whom it may concern:*

Be it known that I, THEOPHILUS H. PAESSLER, a citizen of the United States, residing at Malvern, in the county of Carroll and State of Ohio, have invented certain new and useful Improvements in Tricycles, of which the following is a description.

This invention relates to that class of velocipedes which are mounted on three wheels and called "tricycles;" and its object is to provide means for automatically returning the guide-wheel into line when it is turned to either side, means whereby the operator may use both hands and feet to propel the tricycle, or may use either the hands or feet without the other, and means whereby a tricycle may be provided with an extra set of propelling apparatus for the use of a second rider.

To this end my invention consists in the construction and combination of parts forming a tricycle, hereinafter described and claimed, reference being had to the accompanying drawings, in which—

Figure 1:
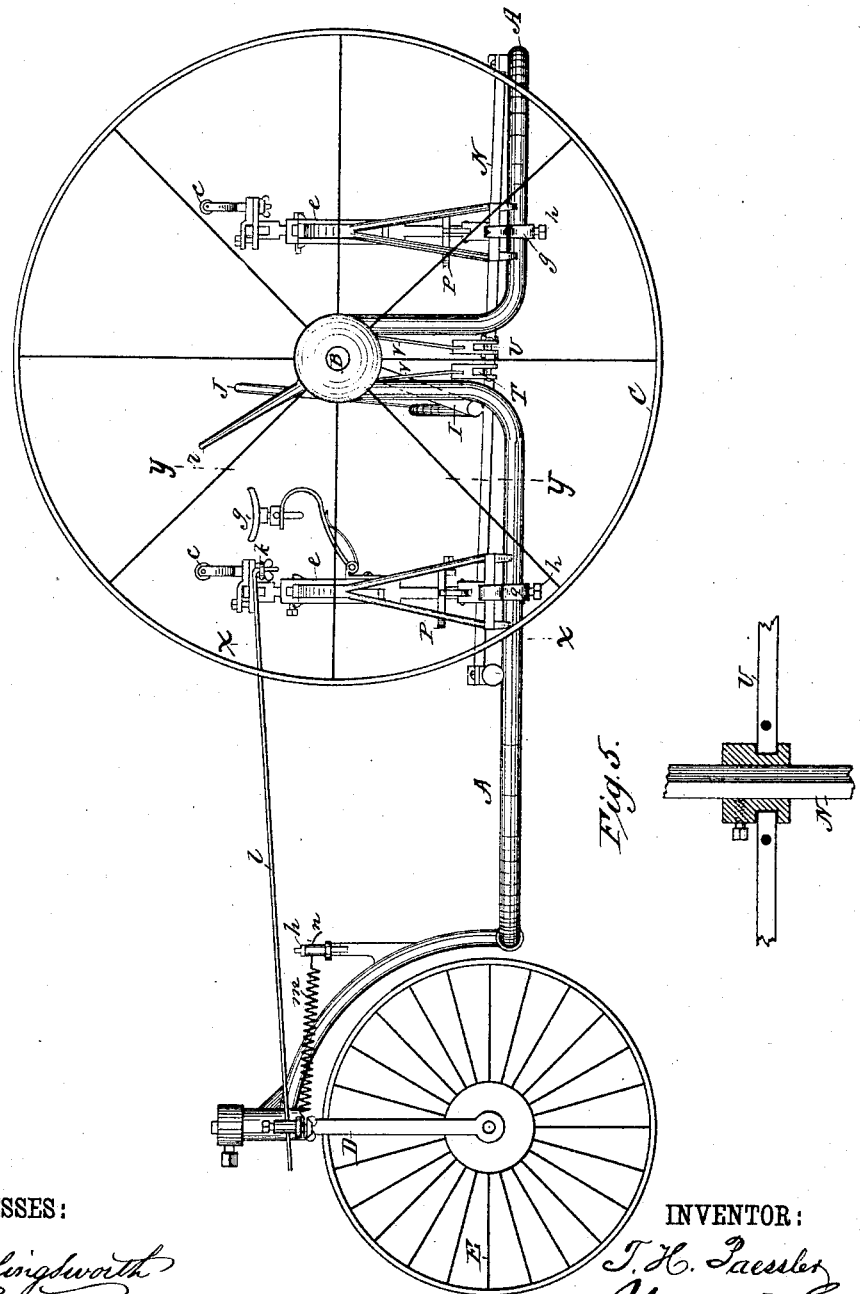
Figure 2:
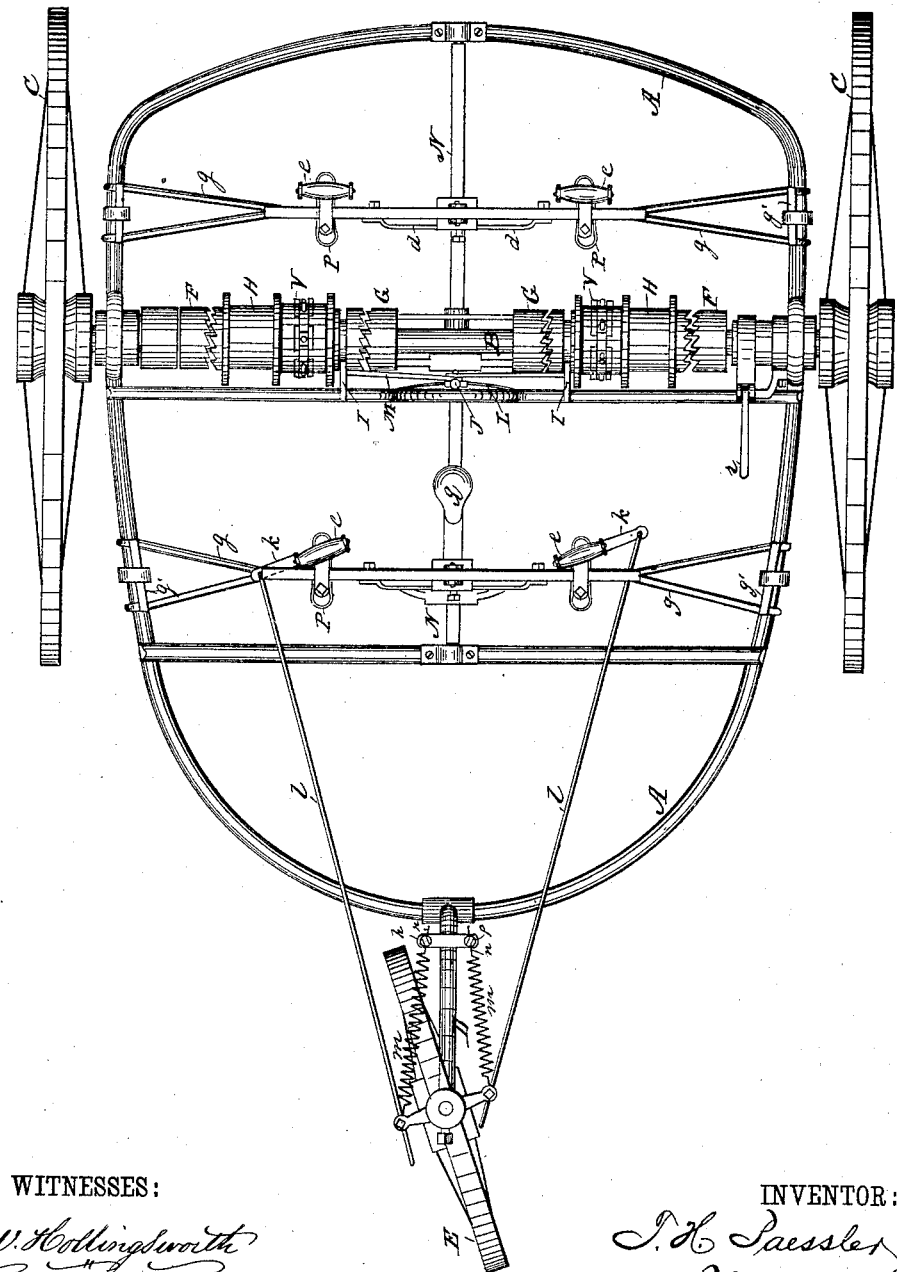
Figure 3:
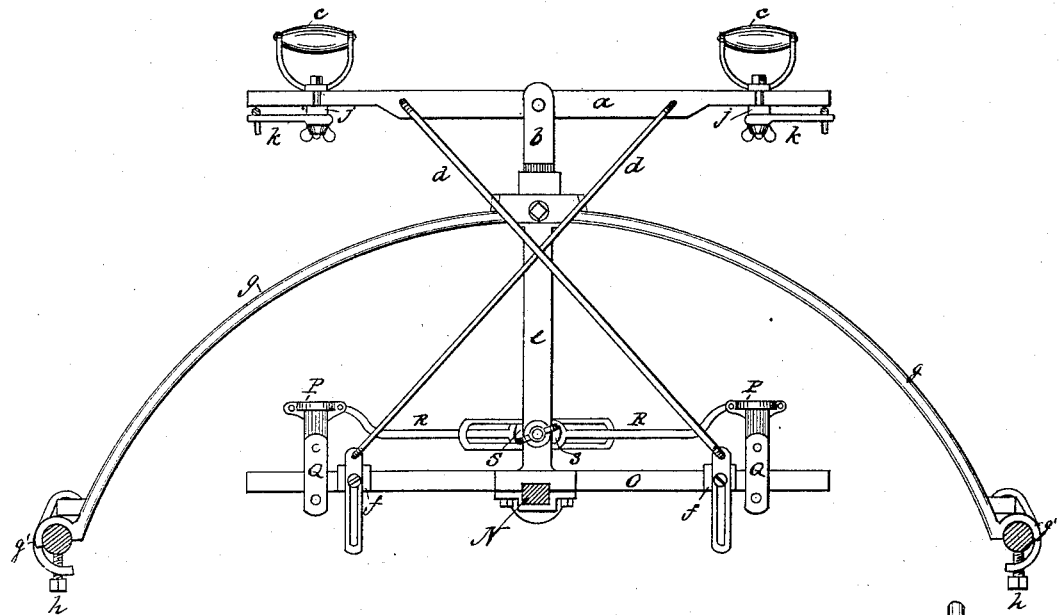
Figure 4:
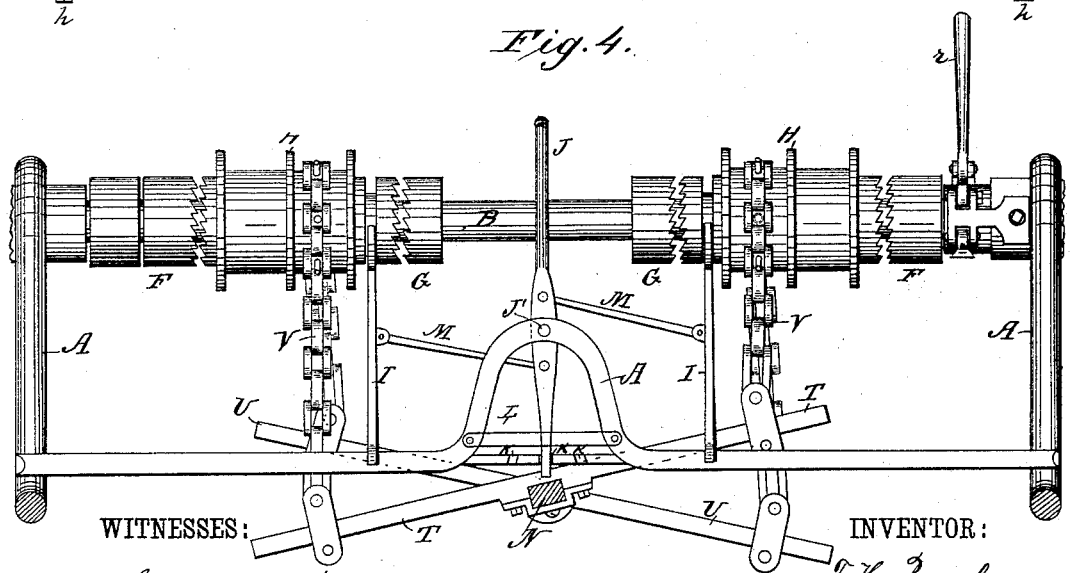

Figure 1 is a side elevation of my invention. Fig. 2 is a plan view thereof. Fig. 3 is a transverse vertical section at $x\,x$. Fig. 4 is a transverse vertical section at $y\,y$. Fig. 5 is a detail view of the bearing of lever U.

A represents the frame of the tricyle, mounted by means of bearings on the axle B of the wheels C and on the fork D of the guide-wheel E. The fork turns in a vertical bearing in the frame, and the axle, being secured to the wheels rigidly by set-screws, revolves in horizontal bearings in the frame, the wheels being driven by the axle. F is a part of a clutch fixed to the axle and having ratchet-teeth on one end facing in the direction to be driven backward, and G is a similar part of a clutch fixed to the axle and having ratchet-teeth to be driven forward.

H is a spool mounted to revolve freely on the axle between the parts F and G, and provided with ratchet-teeth on its ends to engage the teeth either of part F or of the part G.

I is a spring fixed at one end to the frame, and entering at the other end a groove in the spool H, to control the endwise action thereof. J is a hand-lever pivoted at J′ to the frame A, and adapted to engage any one of three notches, K, in the frame, and constantly pressed into such engagement by a spring, L.

M is a rod connecting the lever J with the spring I. When the end of the lever is in the middle notch K, the spring I is in its normal position, giving no pressure either way, and retaining the spool out of engagement at both ends. At such a time the axle and wheels are free to revolve either way. Now, if the hand-lever be set in either of the side notches K, it will bear the spring to one side and cause it to actuate the spool to engage one of the clutches in a manner like a spring-pawl, and if it be set in the other side notch the other clutch will be engaged, so that if a reciprocating rotary motion be given to the spool it will drive the machine forward when the hand-lever is set one way and backward when set the other way. There are two sets of clutches, F G, one each side of the center of the axle, two spools, H, two springs I, one to each spool, and two rods, M, connecting the springs I with the same hand-lever J. One of the rods is attached to the hand-lever above its pivot, and the other below, so that the back-action clutch F is next to each wheel. N is a rock-shaft journaled in the frame.

O is a lever secured at its middle upon the shaft by means of a set-screw.

P P are treadles pivoted in blocks Q, to rock from side to side, said blocks being fixed on the levers O by means of set-screws, to be adjusted longitudinally thereon to give more or less leverage.

R R are parallel bars pivoted at one end to a portion of the frame and at the other end to the treadles. Their action is to prevent the treadles from tipping when the levers are worked. The blocks Q tip out of a vertical line at each move of the levers above or below a horizontal position; but the treadles pivoted thereon and braced by the parallel bars maintain a vertical position while rising and falling. The parallel bars are slotted to slide upon their pivot-block S when the treadles are changed along the levers, and the said bars are adapted to be bound by a set-screw to the block S, to hold them rigidly endwise, that they may fulfill their duty as braces to the treadles, while the block S is free to rock on the pivot.

T is a two-armed lever secured upon the rock-shaft to rock therewith.

U is another two-armed lever, journaled to turn freely on the rock-shaft, so as not to be affected by the rocking thereof.

V V are chains passing over the spools H, each being attached at one end to one end of the lever T, and attached at the other end to the adjacent end of the lever U. By this means a rocking motion of the shaft N is transmitted to the axle B. The lever U serves merely to keep the two chains tightly drawn over the spools It vibrates in a direction around the rock-shaft opposite to the motion of the latter and opposite the lever T. The spools are provided each with two grooves, so that in case belts are used instead of chains a drive-belt connected with lever T may wind in one of the grooves, and a reversing-belt connected with the lever U may wind in the other groove and be connected with the lever U. This is necessary from the fact that the mere passing of a belt over the spool would not give friction enough to operate it, so that the end of the belt may not pass off the spool, but must be secured to it. Where chains are used, the spool is made a sprocket-wheel.

$a$ is a two-armed lever centrally pivoted to a post, $b$, and provided with handles $c$, which are made longitudinally adjustable thereon by means of blocks $j$ and binding-screws, so as to increase or decrease the leverage.

$d\ d$ are diagonal rods connecting the foot-lever O with the hand-lever $a$, so that pressing with the right foot and pulling with the right hand act in the same direction on the rock-shaft, thus balancing the action of the operator.

The post $b$ is fixed to a removable portion, $g$, of the frame to adjust the height of the handles above the treadles to the height of the operator.

The diagonal rods are attached to the levers by means of blocks $f$, which are adjustable along the levers to adapt the rods to any distance which the levers may be set apart.

The portion $g$ is a pair of arched braces provided with broad ends $g'$, fitted to be secured to the frame by means of set-screws $h$, and the post $e$ has a bearing at its lower end for the rock-shaft N.

The working handles $c$ are located directly over the treadles P, in order that the operator may work to advantage. The handles $c$ are attached to the blocks $j$ by vertical pivots, and are provided with arms $k$, which are connected with the fork D by rods $l$, so that by turning either handle the forward wheel may be guided either to the right or left.

The blocks $j$ are adjustably secured on the lever $a$.

The rods $l$ are so loosely attached as not to interfere with the vertical motion of the handles in propelling the tricycle.

$m\ m$ are springs connecting the two sides of the fork D with the frame A, so as to balance each other and hold the wheel straight in the center line of the tricycle.

A wire or rod, $n$, extends from the end of each spring $m$ beneath a set-screw, $p$, in the frame A, whereby the tension of the two springs may be from time to time regulated, so that they shall tend to return the guide-wheel into line whenever it is freed after being turned either to the right or left. $q$ is a seat for the operator, attached by a spring to the post $e$.

I have shown two sets of propelling-gear, one forward of the axle and one behind it, whereby two riders may operate this tricycle at once. The means for attaching the propelling-levers and the braces $g$ enable me to adapt my tricycle for the use of one or more riders. The rear set of propelling apparatus differs from the forward set only in the abscence of the guiding-arms $k$ and rods $l$. Only one set of these are needed, and yet there is no reason why there should not be two sets, for two may work on the plan shown.

The diagonal connections $d$ may be removed, leaving only the foot-power to work the tricycle.

$r$ is a hand-brake for stopping the tricycle at will.

What I claim as my invention, and desire to secure by Letters Patent, is—

1. The combination, in a velocipede, of a driving-wheel, an axle fixed therein, two clutches fixed on the axle and having teeth on their adjacent ends, the teeth of one clutch facing one way in the circle of revolution and the teeth of the other clutch facing the other way, a spool mounted to revolve freely on the axle between the clutches, having teeth on its ends to engage the teeth of the clutches, and having a circumferential groove in the spool, a spring adapted at one end to engage the said groove, and fixed at the other end to the frame in which the axle is journaled, and means, substantially such as described, to hold the spring in its normal position, or to either one side or the other side thereof, substantially as described, whereby the spool is caused to engage either clutch with a springing action or to be disengaged from both.

2. The combination of a velocipede-axle, two spools and clutches thereon, a rock-shaft beneath and at right angles to the axle, a two-armed lever secured midway upon the rock-shaft, chains or belts connecting the two arms of the lever with the two spools on the axle, another two-armed lever secured upon the rock-shaft, and treadles adjustably secured on the said lever, substantially as shown and described.

3. The combination of a rock-shaft journaled in a velocipede-frame, a two-armed lever secured midway on the rock-shaft, treadles pivoted on the lever-arms, and brace-rods pivoted at one end to the treadles, and pivoted at or near the other end to a fixed portion of the frame above or below the center of the lever, substantially as shown and described.

4. The combination of a rock-shaft journaled in a velocipede-frame, a two-armed lever secured midway on each arm, a treadle pivoted on each block, a rod pivoted at one end to each treadle, and slotted along the other end, and a binding-screw through the slot securing the rods to a central fixed portion of the frame on a pivot, substantially as described, whereby the treadles may be adjusted to increase or decrease the leverage, and the brace-rods may be adjusted thereto while maintaining pivotal connections.

5. The combination of a rock-shaft journaled in a velocipede-frame, a two-armed lever secured midway upon the rock-shaft, a treadle upon each arm of the lever, a second lever pivoted midway upon the frame over the first-named lever, a handle upon each arm of the second lever, and rods connecting the two levers diagonally, substantially as shown and described.

6. The combination of a rock-shaft journaled in a velocipede-frame, a two-armed lever secured midway upon the shaft, a second two-armed lever pivoted midway upon the frame over the first-named lever, rods connecting the two levers diagonally, and pivot-blocks for the ends of the rods made adjustable along the arms of the levers, substantially as shown and described.

7. The combination of a rock-shaft journaled in a velocipede-frame, and treadles thereon, an axle journaled at right angles to the rock-shaft, a spool and set of clutches on the axle each side of its center, a two-armed lever secured midway upon the rock-shaft beneath the axle, a two-armed lever journaled on the axle, and chains or straps connecting each end of the fixed lever with each adjacent end of the journaled lever, the said chains or straps passing midway over the aforesaid spools, substantially as shown and described.

8. The combination of the rock-shaft N, the foot-lever O, the hand-levers $a$, the diagonal rods $d$, the adjustable blocks $f$, the vertical post $e$ fixed to the frame, and the post $b$, vertically adjustable on the post $e$, the hand-levers $a$ being pivoted to the adjustable post $b$, substantially as shown and described.

9. The combination of the frame A, the braced portion $g$, provided with broad ends $g'$, fitted to the said frame, the set-screw $h$, the post $e$, secured to the portion $g$, and provided with a journal-bearing at its lower end, and the post $b$, vertically adjustable in its upper end, substantially as shown and described.

10. The combination of the frame A, the wheel E, the fork D, the lever $a$, the blocks $j$, adjustably secured thereon, the handles $c$, the arms $k$, and the rods $l$, substantially as shown and described.

THEOPHILUS H. PAESSLER.

Witnesses:
S. J. ACKEY,
JOHN KRATZ.